(No Model.)  2 Sheets—Sheet 1.
J. C. HENRY.
ELECTRIC CAR BRAKE.
No. 564,195. Patented July 21, 1896.
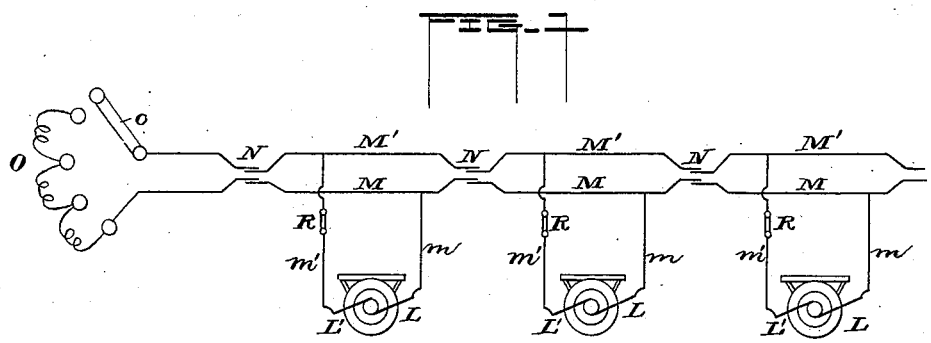
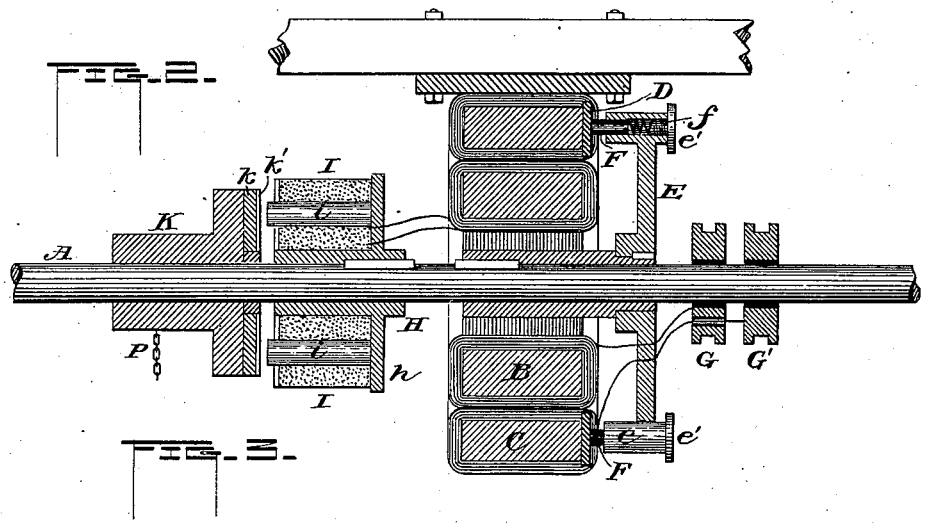
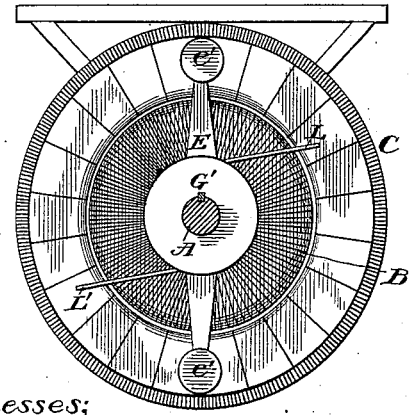
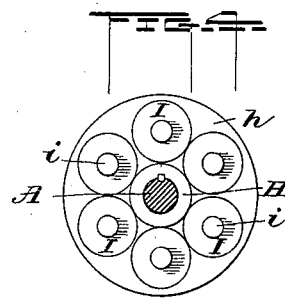
Witnesses:
O. W. Smith
T. M. Rhett
Inventor
John C. Henry (No Model.) 2 Sheets—Sheet 2.
J. C. HENRY.
ELECTRIC CAR BRAKE.
No. 564,195. Patented July 21, 1896.
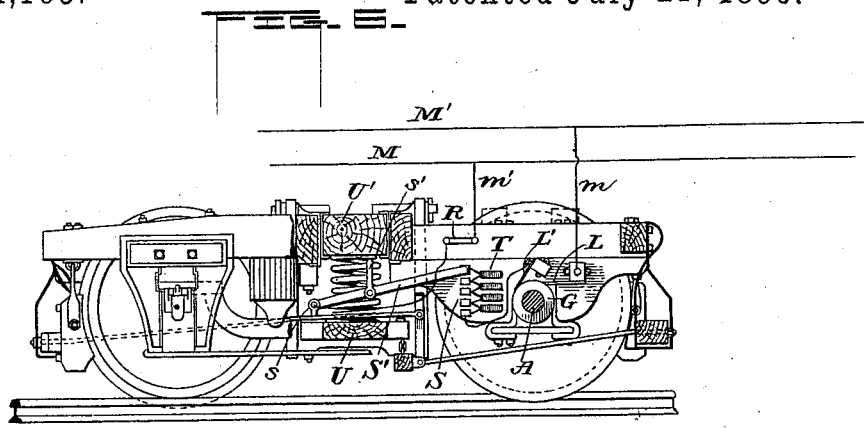
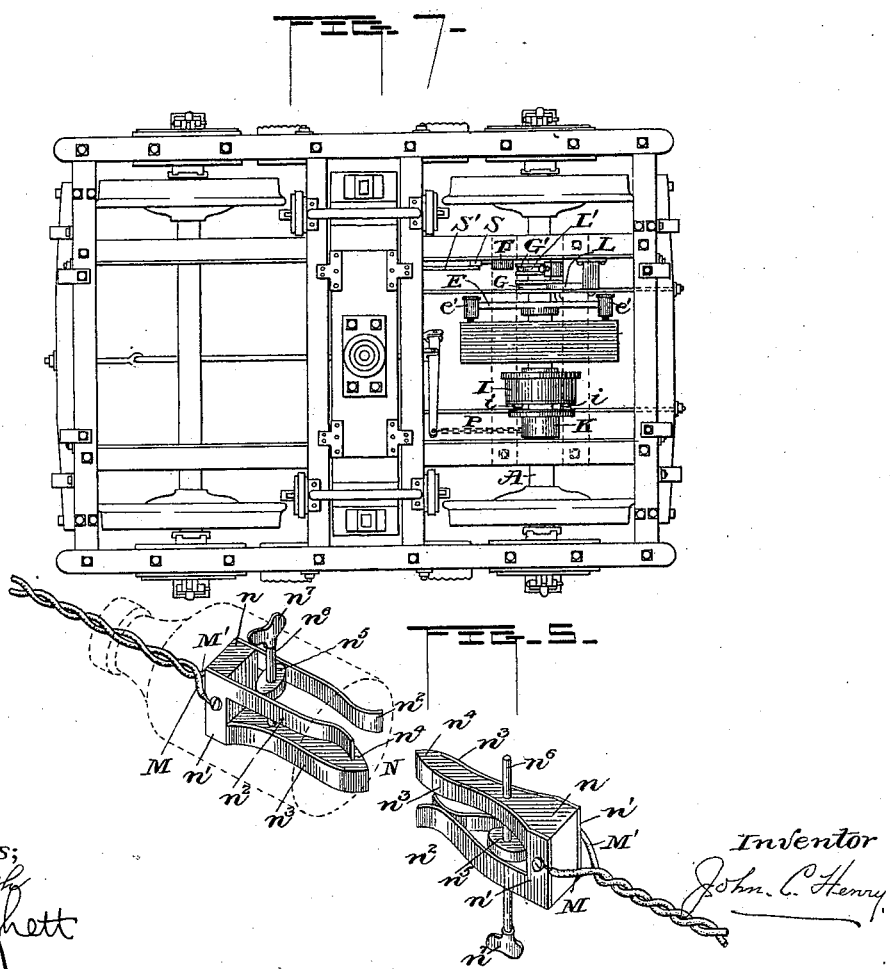
Witnesses:
C. W. Smith
J. M. Rhett
Inventor
John C. Henry
THE NORRIS PETERS CO., PHOTO-LITHO., WASHINGTON, D. C.

UNITED STATES PATENT OFFICE.

JOHN C. HENRY, OF COLORADO SPRINGS, COLORADO.

ELECTRIC CAR-BRAKE.

SPECIFICATION forming part of Letters Patent No. 564,195, dated July 21, 1896.

Application filed July 15, 1895. Serial No. 555,963. (No model.)

*To all whom it may concern:*

Be it known that I, JOHN C. HENRY, a citizen of the United States, residing at Colorado Springs, in the county of El Paso and State of Colorado, have invented certain new and useful Improvements in Electric Car-Brakes; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in brakes for railway-cars, and its object is to provide a train of cars with electric brakes which are controlled from any part of the train, preferably the locomotive, and in event of accident are automatically applied. Moreover, I aim to provide a brake in which the pressure on the brake-shoes will not be sufficient to slide the wheels, but yet will give a maximum braking effect, and will be greater at high speeds and with heavy loads than at low speeds and with light loads—all of which are desirable and even necessary characteristics of the modern car-brake. The brake hereinafter to be more fully described is of the class where the energy of the moving cars is reversed and used to stop them, the class being usually known as "momentum brakes."

I have shown and described in my Patent No. 499,543 a brake system in which each car has an alternating-current generator driven by one of the car-axles, and having its closed-circuit armature arranged to energize a magnetic clutch and winding-drum when the normally-open field-circuit is closed, the field-circuits of all the generators being in series.

My present invention substitutes direct-current generators for the alternating-current generators shown in my said patent, the field-coil, armature, and electromagnetic clutch being in series, and the several machines being connected in parallel to mains leading to a rheostat on the locomotive, or at some other convenient point on the train. The connections of the mains between the cars are made by automatic self-closing couplings, adapted to close when the cars are separated and complete a local circuit on each car, so that if the train breaks in two the rear section will be automatically stopped.

In the drawings, Figure 1 is a diagram of the circuits on a train of three cars. Fig. 2 is an axial section of one of the generators and its clutch and winding-drum. Fig. 3 is an end view. Fig. 4 is an end view of the clutch. Fig. 5 shows the self-closing coupling. Fig. 6 is a sectional elevation, and Fig. 7 a plan view, of a modification.

Keyed on one of the axles A of each car is a field-magnet B, preferably of the Gramme-ring type. It is arranged concentrically with the axle, with which it revolves, and also concentrically with a stationary Gramme-ring armature C, bolted to the truck-frame. On one end of the armature is a commutator D of any suitable construction, but preferably of considerable diameter, and having its segments arranged with their working faces in a plane of rotation that is perpendicular to the axis of the car-axle.

Keyed to the axle or to the hub of the field-magnet is the brush-holder E, having two diametrically-opposite arms carrying at their outer ends the carbon or other brushes F, preferably held in sockets $e$, which contain the usual pressure-spring $f$ adjustable by a screw-plug $e'$ in the outer end of the socket.

Adjacent to the brush-holder are two collector-rings G G', insulated from but secured to the axle A, and serving as the terminals of the generator, which is of the series type.

Keyed to the axle A at a convenient place is a hub H, having a flange $h$, to which are secured several electromagnets I, whose cores $i$ are parallel with the axle, and terminate in a plane of revolution adjacent to a flanged winding-drum K, loose on the axle and having a magnetic collar $k$ with a non-magnetic friction face-plate $k'$, to come in contact with the cores $i$. The electromagnets I are connected in series with each other and with the generator, so that the current generated by the revolution of the field-magnet will pass through and energize the electromagnets and cause them to attract and hold the drum K, thereby constituting a magnetic clutch.

Pressing against the collector-rings G G' are brushes L L', which convey the current, by means of branch conductors $m\,m'$, to mains M M' running through the car. A switch R in one of the branch conductors permits a disabled car to be cut out without disturbing the rest of the system.

The mains are provided at each end of the car with a self-closing coupling, by means of which the corresponding mains on adjacent cars can be connected so as to form a continuous circuit through the train. The coupling N is clearly shown in Fig. 5. Each half is a duplicate of the other, having a suitable shell, (shown in dotted lines,) in which is inclosed an insulating-block $n$, on which are secured two similar metallic plates $n'$, which form the terminals of the mains M M'. Each plate has two fingers $n^2 n^3$, the former being free to move and having a curved end, the latter being fixed to one side of a tongue $n^4$ projecting from the block $n$. The fingers $n^2$ are kept normally in contact by their own resilience, but they can be separated and held apart by a cam or eccentric $n^5$ on a spindle $n^6$, which has a bearing in the tongue $n^4$ and the inclosing shell, and is provided with a head $n^7$, by means of which it can be turned to separate the spring-fingers $n^2$ or permit them to close. When the two parts of this coupling are brought together, the tongue on each one enters between the spring-fingers on the other, and the mains M M' on one car are connected with the corresponding mains on the other car. On the locomotive or at some other convenient point there is a rheostat O, whose switch $o$ is kept open when the train is running.

The operation of the invention is as follows: So long as the circuit of the mains M M' remains open, the generators produce no current, and the winding-drums K hang loose on the axles. But when the brakes are to be applied, the engineer turns the switch $o$, closing the circuit M M' through the rheostat O, and causing the generators to energize the clutch-magnets I, which attract and hold the winding-drums, causing them to rotate with the axle and wind up the brake-chains P. Since the only obstacle to the sliding of the drum on the ends of the cores $i$ is the magnetic attraction, it is evident that this can be so regulated by the rheostat O as to permit the drum to slip before the brakes are applied hard enough to slide the wheels. Inasmuch as the strength of the current depends upon the speed, it is evident that this slipping will not take place so soon at high speeds as at low speeds, so that the pressure on the brake-shoes will be greater at high speeds. Should any brake accidentally go on so hard as to slide the wheels, the cessation of the rotation of the field-magnet at once stops the generation of the current, so that the clutch ceases to act and the brakes are slacked off, thus preventing the formation of flat spots on the wheels.

In Fig. 1 I have shown the different generators connected to the mains in parallel. The object of this is to avoid the high electromotive force which a large number of such machines would give if coupled in series, (on freight-trains it is quite common to see from fifty to one hundred cars upon a train.) Another and more important reason for this manner of coupling up is that the dynamos will more readily assist each other to build up the field's magnetization, which is mainly dependent in the resistance of the circuit, and on the initial or residual magnetism of the field-magnets; the current from the quickest-acting machine helps excite the others.

In making up the train, the cam $n^5$ at the rear end of each car is turned so as to hold open the spring-fingers $n^2$, while the fingers at the forward end are left free to close. This does not interfere with the connection of the mains; but if the train accidentally breaks in two, the fingers $n^2$ at the front end of the rear section close instantly and complete a local main circuit on that section, the resistance of which is very low, so that the brakes will be applied with the greatest possible force on said rear section of the train. The circuit on the forward section, however, is not automatically closed, but remains under the control of the engineer.

When the cars are being shifted in a yard, the cams at both ends of the car can be turned so as to keep the main circuit open.

In the modification shown in Figs. 5 and 6 I provide means for automatically varying the pressure on the brake-shoes in accordance with the load. It is well known that a heavily-loaded car requires the expenditure of greater braking power to stop it than one which is lightly loaded or empty, because the momentum is greater in the case of the heavily-loaded car; and since the friction between the wheels and the rails is also greater, a heavier pressure can be exerted on the brake-shoes without sliding the wheels. If the same brake-pressure is used throughout a train made up of loaded and light cars, there will be produced a series of violent and destructive shocks when the brakes are applied, owing to the unequal rates of retardation on different cars. The modification I have devised overcomes this difficulty. In one of the branch conductors $m$ or $m'$ I interpolate a rheostat S, preferably mounted on the safety beam-block T of the truck. The contact-plates of the rheostat are swept by a switch-arm S' fulcrumed on a suitable support $s$ on the spring-plank U of the truck. Between this fulcrum and the end of the arm is jointed a link $s'$, which is hinged at its upper end to the bolster U'. The branch conductor is connected with the switch-arm, and the arrangement is such that when the car is empty or the load light the entire resistance is in series with the dynamo and clutch. As the load is increased and the bolster-springs are compressed, the downward movement of the bolster forces down the switch-arm, cutting out the resistance-coils one by one, thus gradually decreasing the resistance and permitting the dynamo to generate a stronger current.

The clutch will therefore be more strongly energized and exert a more powerful pull on the brake-chain before permitting the drum to slip. In this way the braking effect can be made to bear a constant ratio to the load, within narrow limits, and the operation of the brakes throughout the train can be rendered more smooth and uniform.

Having thus described my invention, what I claim is—

1. An electric train-brake of the momentum class, comprising a direct-current dynamo on each car, a magnetic clutch in series therewith, and brake-gearing operated by said clutch, the dynamos on the several cars being connected together in parallel, substantially as described.

2. An electric train-brake of the momentum class, comprising a direct-current dynamo having its field-magnet secured to the car-axle and a stationary armature concentric therewith, a magnetic clutch secured to the axle and in series with said dynamo, a winding-drum operated by said clutch, and mains leading from said dynamo to a circuit-controlling device, substantially as described.

3. In an electric train-brake of the momentum class, the combination with a plurality of cars, of a direct-current dynamo on each car, driven by the car-axle, a magnetic clutch in series with each dynamo, a winding-drum operated by said clutch, mains running through the cars, with which the dynamos are connected together in parallel, and a rheostat on the locomotive to control the circuit of the mains, substantially as described.

4. In an electric car-brake of the momentum class, the combination with a plurality of cars, of mains running through said cars, self-closing couplings for said mains between the cars, a direct-current dynamo on each car, connected across said mains, and magnetic brake-operating apparatus in series with said dynamo, substantially as described.

In testimony whereof I affix my signature in presence of two witnesses.

JOHN C. HENRY.

Witnesses:
   D. CARL HENRY,
   SADIE HENRY.